United States Patent [19]

Shackle et al.

[11] Patent Number: 4,480,219
[45] Date of Patent: Oct. 30, 1984

[54] PHASE-TO-VOLTAGE CONVERTER

[75] Inventors: Peter W. Shackle, Melbourne; Robert S. Pospisil, Palm Bay, both of Fla.

[73] Assignee: Harris Corporation, Melbourne, Fla.

[21] Appl. No.: 372,812

[22] Filed: Apr. 28, 1982

[51] Int. Cl.³ .............................................. H02P 5/40
[52] U.S. Cl. ..................................... 318/729; 318/812
[58] Field of Search .................. 318/729, 812, 814; 307/511, 514, 246, 252, 4 A, 516, 517; 323/242; 324/83 A, 89; 328/133

[56] References Cited

U.S. PATENT DOCUMENTS

| | | | |
|---|---|---|---|
| 2,820,143 | 1/1958 | D'Nelly et al. | |
| 3,009,167 | 11/1981 | Aspden et al. | 324/83 A |
| 3,427,471 | 2/1969 | South | |
| 3,443,188 | 5/1969 | Mortimer | 323/242 |
| 3,544,813 | 12/1970 | Bjerke | |
| 4,278,903 | 7/1981 | Ichinose | 307/246 |

Primary Examiner—David Smith, Jr.
Attorney, Agent, or Firm—Barnes & Thornburg

[57] ABSTRACT

A phase-to-voltage converter having a capacitor whose terminals are alternately charged by an AC voltage supply while the other terminal is fixed at a reference potential. The charging of the terminals is terminated by a switch which monitors the reversal of the current through the inductive load.

13 Claims, 2 Drawing Figures

PHASE-TO-VOLTAGE CONVERTER

BACKGROUND OF THE INVENTION

The present invention relates generally to phase-to-voltage converters and, more specifically, to an alternating current driven phase-to-voltage converter.

Phase-to-voltage converters are well-known and generally include a capacitor which is charged beginning with the zero intercept of one signal and stopped at the zero intercept of the second signal such that the capacitor's voltage represents the phase difference between the two signals. Although the control signals are alternating current signals, the capacitor is charged from a source of direct current potential. Such a circuit to measure the phase difference between the current and voltage is described in U.S. Pat. No. 3,427,471 to South. A similar system to measure the difference in time between two parts of a single waveform is described in U.S. Pat. No. 3,544,813 to Bjerke. Another system using the same concept to measure the phase between a reference signal and a test signal is described in U.S. Pat. No. 2,820,432 to D'Nelly et al.

The phase-to-voltage converters of the prior art have not been designed for the monolithic environment since size and space was not a requirement. With the use of monolithic controllers, essentially for motors and other devices, there is a great need for a monolithic phase-to-voltage converter. One of the major drawbacks of the prior art system is the requirement of a direct current voltage source to charge the capacitor. Thus, there exists the need for a monolithic phase-to-voltage converter which is capable of using the alternating current voltage available in the system.

SUMMARY OF THE INVENTION

An object of the present invention is to provide a monolithic phase-to-voltage converter.

Another object of the present invention is to provide a phase-to-voltage converter which operates off an alternating current voltage.

Still another object of the present invention is to provide a monolithic phase-to-voltage converter which operates independent of direct current voltage sources.

An even further object of the present invention is to provide a monolithic phase-to-voltage converter having a single external capacitor for providing both positive and negative output signals.

A still further object of the present invention is to provide a monolithic phase-to-voltage converter whose positive and negative voltage peaks are identical in time relative to the voltage zero crossing of the load.

These and other objects of the present invention are attained by charging a single capacitor alternately from a positive voltage means and a negative voltage means both derived alternately from an AC voltage source. A first switch connects the negative side of the capacitor to a reference terminal in response to the positive voltage and a second switch connects the positive terminal of the capacitor to the reference potential in response to the negative voltage. The switches cause the corresponding side of the capacitor to be fixed at the reference potential while the other terminal is being charged by the appropriate voltage from the load. Terminating switches, each connected in parallel with one terminal of the capacitor and the reference potential, are responsive to the reversing of the current through a load to terminate the charging of the capacitor such that the rate of increase of the voltage across the capacitor represents the phase difference between the alternating current through the load and the phase of the AC voltage source powering the circuit. Current sources are connected between the positive and negative capacitor terminals and positive and negative lines to charge the positive and negative terminals in response to the positive and negative voltage signals. Current sinks responsive to the positive and negative voltages on the line are provided in parallel with the capacitor and the reference potential so as to limit the amount of charge which accumulates on the capacitor. The terminating switches are latched on once activated until the supply voltage reverses polarity.

Other improvements, advantages and novel features of the present invention will become apparent from the following detailed description when considered in conjunction with the accompanying drawings.

DESCRIPTION OF THE PREFERRED EMBODIMENTS

Figure 1:
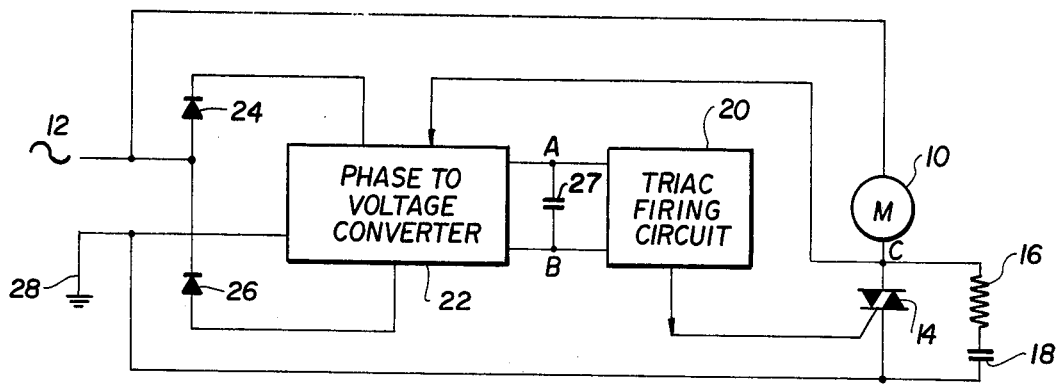
FIG. 1 is a schematic of a motor control circuit incorporating the phase-to-voltage converter of the present invention.

An alternating current motor control circuit is illustrated in FIG. 1 as including a motor 10 connected in series with a source of alternating current 12 and a triac 14. A series combination of a resistor 16 and capacitor 18 are connected in parallel with triac 14. A triac firing circuit 20 is connected to the gate of triac 14. The firing circuit is well-known and fires the triac in such a way so as to control the current through the motor coil 10 to control the RMS voltage applied to the motor. A phase-to-voltage converter 22 is shown connected to the alternating current source 12 by diodes 24 and 26. These diodes provide half wave rectification to the phase-to-voltage converter 22. Points A and B which represent the terminals of the capacitor 27 are connected to the phase-to-voltage converter 22. A ground 28 is also shown connected to the phase-to-voltage converter 22.

As is well-known, the firing circuit 20 gates the triac 14 on. Since the motor 10 is a large inductive load, the current through the circuit lags the voltage. At the point that the current through the motor goes through zero, triac 14 turns off. The non-zero voltage across the motor is imposed across the capacitor 18. Since the triac 14 is bidirectional, the circuit operates the same for both halves of a cycle with the current through the motor 10 and the voltage across the capacitor being reversed. Although FIG. 1 illustrates a specific motor control circuit, other circuits may be used which are equivalent for full wave control of an inductive load.

As will be explained more fully in the detailed description of FIG. 2, the phase-to-voltage converter 22 monitors the alternating current voltage applied to the load via the diodes 24 and 26 and determines the current reversal through the motor by monitoring the voltage at point C. As is evident from FIG. 2, the charging current for the phase-to-voltage converter 22 originates from the AC source 12 which is used to drive the motor 10. No direct current source is needed. This allows the phase-to-voltage converter 22 to be formed on a monolithic chip with the firing circuit 20 and diodes 24 and 26.

Figure 2:
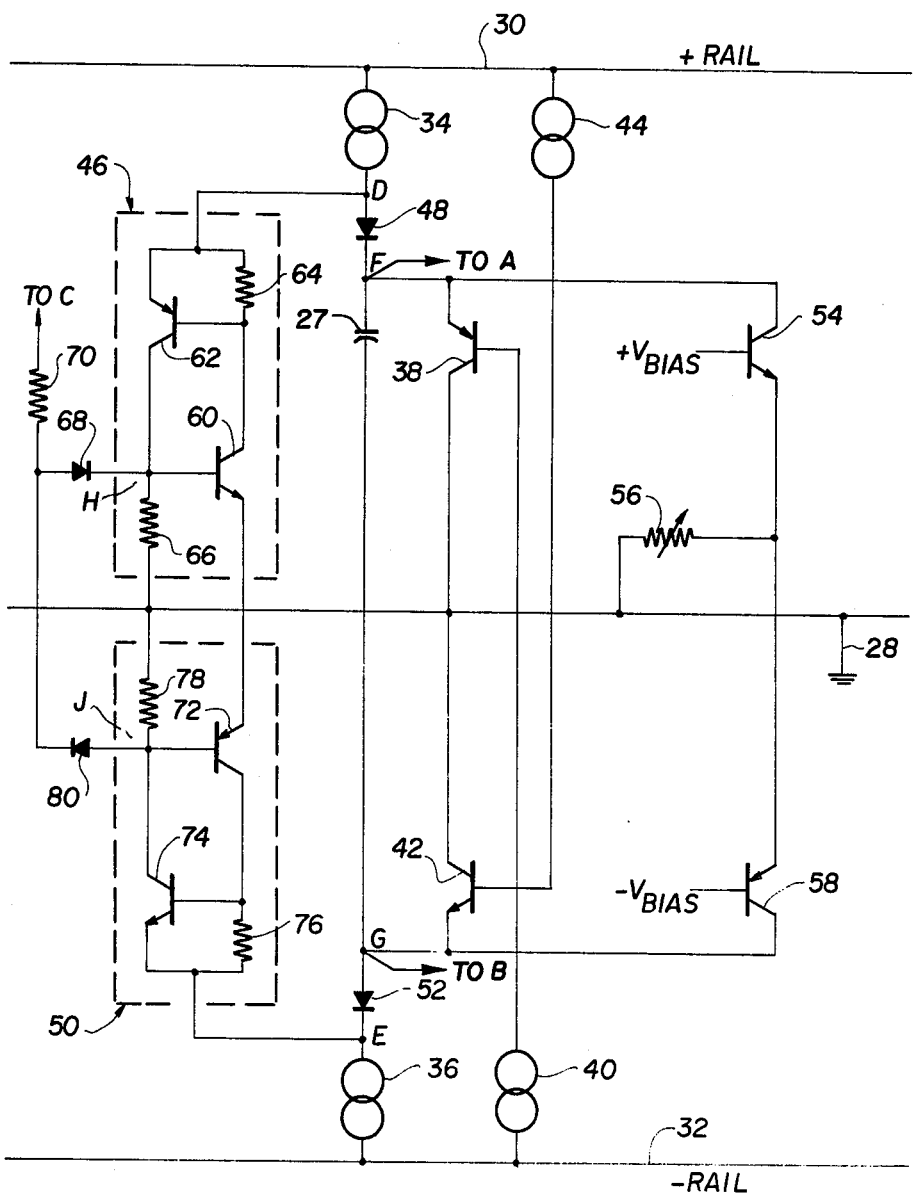
FIG. 2 is a schematic of a phase-to-voltage converter incorporating the principles of the present invention.

The phase to voltage converter 22 is illustrated in detail in FIG. 2 and includes the positive rail 30 which represents the output of the half wave rectifier 24 and the negative rail 32 which represents the output of the negative half wave rectifier 26. The ground 28 is also shown. The positive terminal F of capacitor 27 is connected to the positive rail 30 by current source 34 and diode 48 and the negative terminal G of capacitor 27 is connected to the negative rail 32 by current source 36 and diode 52. The juncture of the current source 34 and the anode of diode 48 is represented by the letter D and the juncture of current source 36 and the cathode of diode 52 is represented by the letter E.

A switch 38 connects the positive terminal F of capacitor 27 to the ground or reference potential 28 and is responsive to the negative rail 32. The switch 38 is illustrated as a PNP transistor having its emitter connected to point F, its collector connected to the reference potential 28 and its base connected to negative rail 32 by a current source 40. As will be explained more clearly in the operation of the circuit, the switch 38 forces the positive terminal F of the capacitor 27 to the ground potential 28 when the negative rail 32 is high. A switch 42 responsive to the positive rail 30 connects the negative terminal G of the capacitor to the ground potential 28 and causes the negative terminal to assume ground potential when the positive rail 30 is high. The switch 42 is illustrated as an NPN transistor having its emitter connected to point G, its collector connected to the ground potential 28 and its base connected to the positive rail 30 by a current source 44.

A first terminating switch 46 connects the point D to the ground potential 28 and is responsive to the reversal of the motor current from a negative to a zero current so that the voltage at point C changes from a small negative to a large positive to terminate the charging of the positive terminal of the capacitor. The switch 46 is illustrated as a NPN transistor 60, PNP transistor 62 and resistors 64 and 66 connected between point D and ground 28 with its control terminal H being connected through diode 68 and resistor 70 to point C of the motor drive circuit of FIG. 1. The transistors 60 and 62 are connected to be the equivalent of an SCR such that terminating switch 46 is latched and reset when the current through the SCR is zero at the beginning of the negative half cycle.

A second terminating switch 50 connects point E to the ground potential 28 and is illustrated as including a PNP transistor 72, NPN transistor 74 and resistors 76 and 78 forming a latching switch. The control terminal J of switch 50 is connected through resistor 70 and diode 80 to point C of the motor drive circuit of FIG. 1. Once the current through the motor reverses from positive to zero so that the voltage at point C changes from small positive to large negative, the switch 50 is turned on to terminate the charge of the negative terminal of capacitor 27.

A positive current sink 54 is connected to point F and ground 28 via variable resistor 56. A negative current sink 58 is connected to point G and ground 28 also via the variable resistor 56. By varying the value of resistor 56, the amount of current sunk by the current sinks 54 and 58 may be varied. Current sink 54 is illustrated as an NPN transistor having its collector connected at point F, its emitter connected to the variable resistor 56 and its base connected to a positive reference bias voltage +V bias activated by rail 30. Similarly, the negative current sink 58 is illustrated as a PNP transistor having its collector connected to point G, its emitter connected to the variable resistor 56 and its base connected to a negative reference bias voltage −V bias activated by rail 32.

To further understand the phase-to-voltage converter of FIG. 2, we will discuss its operation in detail. For a positive half-cycle, the positive rail 30 is high, activating current sources 34 and 44. The activation of current source 44 biases the transistor 42 ON which connects the negative terminal of capacitor 27 or point G to ground 28 so as to cause the negative terminal of the capacitor 27 or point G to be drawn up to ground potential. The current source 34 then drives the positive terminal F of capacitor 27. Since the positive current sink 54 is also activated it sinks some of the current from current source 34. Once the current through the load 10 of FIG. 1 reverses, the triac 14 is cut-off and the voltage to point C rises. This turns on terminating switch 46 which sinks the current from current source 34 to ground and terminates the charging of the positive terminal of capacitor 27. In order to prevent further charging of the capacitor after the triac has fired again, the terminating switch 46 latches on once triggered. Thus, point F is locked into a nearly fixed voltage depending upon when the terminating switch 46 is turned on. Ideally, the charge stored on 27 is so great compared to the rate at which sink 54 is removing charge with its current that the voltage at F then remains relatively steady.

For the second half cycle or the negative half-cycle of the alternating current, the positive rail 30 goes low turning off transistors 42 and 54 and current sources 34 and 44. Since the triac 14 is activated with the inductively delayed current still passing through the motor winding, point C stays positive initially leaving switch 46 on (but unbiased). With the negative rail 32 going high, current sources 36 and 40 are turned on. Current source 40 turns on switch 38 connecting the positive terminal of capacitor 27 to ground potential 28. When the positive rail 30 goes low, current source 34 turns off and switch 46 is turned off. Current source 36 charges point E and the negative terminal G of capacitor 27. The negative current sink 58 is activated by the negative rail 32 and sinks a portion of the current of current source 36 as determined by the variable resistor 56. When the current through the load 10 goes to zero, the triac turns off and the voltage on point C goes from small positive to large negative turning on terminating switch 50. This connects the point E to ground 28 sinking the current of current source 36 and terminating the charging of the negative terminal of capacitor 27. This effectively locks point G at a fixed voltage depending upon when the terminating switch 50 turns on.

It should be noted that the phase-to-voltage converter only comes into equilibrium with a constant charge on the capacitor 27 when it is used in conjunction with the control loop including the feedback from point C to turn on the terminating switches sooner for higher voltages across the capacitor. This function is carried out by the triac firing circuit 20.

As can be seen from the detailed description of the operation of FIG. 2, the phase-to-voltage converter 22 provides a voltage which is representative of the phase relationship of the AC voltage applied to the motor and the current through the motor. The capacitor 27 of the phase-to-voltage converter is driven by the alternating current which is also used for the load and no direct current source is used. Thus, it can readily be seen that the phase-to-voltage converter 22 can be formed monolithically on a single chip and is capable of running off an AC power line.

It is evident from the detailed description of the present invention that the objects of the invention are attained in that a monolithic phase-to-voltage converter is provided which uses alternating current as its power supply.

Although the invention has been described and illustrated in detail it is clearly understood that the same is by way of illustration and example only and not to be taken by way of limitation. The phase-to-voltage converter 22 is shown to be used with the motor, but it is evident that they may be used with other loads wherein a phase relationship between the alternating voltage supply and another signal is required. In particular this circuitry can be realized using both MOSFET and JFET transistors or any kind of amplifying device in addition to the bipolar transistors illustrated here. The current sources referred to do not necessarily have to be perfect current sources and may even be simple resistors. The spirit and scope of the present invention is to be limited only by terms of the appended claims.

What is claimed is:

1. A phase-to-voltage converter for a load comprising:
   a first and second voltage means for providing positive and negative half cycles of the alternating current voltage used to drive said load, respectively;
   capacitor means having positive and negative terminals connected respectively to said first and second voltage means to be charged thereby;
   a first switch means for connecting said negative terminal of said capacitor means to a reference potential in response to said first voltage means;
   a second switch means for connecting said positive terminal of said capacitor means to said reference potential in response to said second voltage means;
   first terminating means connected to said positive terminal of said capacitor means for terminating the charging of said capacitor means without discharging said capacitor means in response to a current reversal through said load from positive to zero;
   second terminating means connected to said negative terminal of said capacitor means for terminating the charging of said capacitor means without discharging said capacitor means in response to a current reversal through said load from negative to zero;
   the voltage across said capacitor means representing the phase relationship of said voltage and current of said load.

2. The phase-to-voltage converter according to claim 1, wherein said first terminating means includes a third switch means connected in parallel with said capacitor means and a first current reversal means for activating said third switch means in response to a positive to zero current reversal of the load current, and said second terminating means includes a fourth switch means in parallel with said capacitor means and a second current reversal means for activating said fourth switch means in response to a negative to zero current reversal of the load current.

3. The phase-to-voltage converter according to claim 2, wherein:
   said third switch means includes a NPN transistor having its emitter connected to said reference potential, its collector connected to said positive terminal of said capacitor means and its base connected to said first current reversal means; and
   said fourth switch means includes a PNP transistor having its emitter connected to said reference potential, its collector connected to said negative terminal of said capacitor means and its base connected to said second current reversal means.

4. The phase-to-voltage converter according to claim 3, wherein:
   said third switch means includes a diode having its anode connected to said collector of said NPN transistor and its cathode connected to said positive terminal of said capacitor means; and
   said fourth switch means includes a diode having its cathode connected to said collector of said PNP transistor and its anode connected to said negative terminal of said capacitor means.

5. The phase-to-voltage converter according to claim 4, including:
   a first current sink means connected to said positive terminal of said capacitor means for sinking current from first current source means in response to said first voltage means; and
   a second current sink means connected to said negative terminal of said capacitor means for sinking current from said second current source means in response to said second voltage means.

6. The phase-to-voltage converter according to claim 5, wherein:
   said first current sink means includes an NPN transistor having its collector connected to said positive terminal of said capacitor means, its emitter connected to said reference potential through a resistance and its base connected to said first voltage means; and
   said second current sink means includes a PNP transistor having its collector connected to said negative terminal of said capacitor means, its emitter connected to said reference potential through a resistance and its base connected to said second voltage means.

7. The phase-to-voltage converter according to claim 6, wherein said resistances are variable to adjust the amount of current sunk by said first and second current sinks.

8. The phase-to-voltage converter according to claim 1, wherein said load is an induction motor.

9. The phase-to-voltage converter according to claim 1, wherein said first and second terminating means are latching means.

10. The phase-to-voltage converter according to claim 9, wherein said load is an induction motor and series connected gated control device, said first and second terminating means remain activated after gating of said gated control device.

11. A phase-to-voltage converter for an inductive load comprising:
   capacitor means having positive and negative terminals;
   a reference potential;
   first and second half-wave rectifier means for connecting said positive and negative terminals of said capacitor means, respectively, to positive and negative portions of the alternating current voltage used to drive said load to thereby charge the respective terminals;

first and second switch means for connecting said negative and positive terminals of said capacitor means, respectively, to said reference potential when the other terminal is being charged;

first and second terminating means connected to said positive and negative terminals, respectively, of said capacitor means for terminating the charging of said positive and negative terminals, respectively, of said capacitor means without discharging said capacitor means in response to reversal of the current through said load; and the voltage across said capacitor means representing the phase relationship of said voltage and current of said load.

12. A phase-to-voltage converter for a load comprising:

a first and second voltage means for providing positive and negative half cycles of the alternating current voltage used to drive said load, respectively;

capacitor means having positive and negative terminals connected respectively to said first and second voltage means to be charged thereby;

a first switch means including an NPN transistor having its emitter connected to said negative terminal of said capacitor means, its collector connected to said reference potential and its base connected to said first voltage means for connecting said negative terminal of said capacitor means to a reference potential in response to said first voltage means;

a second switch means including a PNP transistor having its emitter connected to said positive terminal of said capacitor means, its collector connected to said reference potential and its base connected to said second voltage means for connecting said positive terminal of said capacitor means to said reference potential in response to said second voltage means;

first terminating means connected to said positive terminal of said capacitor means for terminating the charging of said capacitor means in response to a current reversal through said load from positive to zero;

second terminating means connected to said negative terminal of said capacitor means for terminating the charging of said capacitor means in response to a current reversal through said load from negative to zero;

the voltage across said capacitor means representing the phase relationship of said voltage and current of said load.

13. A phase-to-voltage converter for a load comprising:

a first and second voltage means for providing positive and negative half cycles of the alternating current voltage used to drive said load, respectively;

capacitor means having positive and negative terminals connected respectively to said first and second voltage means to be charged thereby;

first current source means connected to said first voltage means and said positive terminal of said capacitor means for charging said capacitor means from said first voltage means;

second current source means connected to said second voltage means and said negative terminal of said capacitor means for changing said capacitor means from said second voltage means;

a first switch means for connecting said negative terminal of said capacitor means to a reference potential in response to said first voltage means;

a second switch means for connecting said positive terminal of said capacitor means to said reference potential in response to said second voltage means;

first terminating means connected to said positive terminal of said capacitor means for terminating the charging of said capacitor means in response to a current reversal through said load from positive to zero;

second terminating means connected to said negative terminal of said capacitor means for terminating the charging of said capacitor means in response to a current reversal through said load from negative to zero;

the voltage across said capacitor means representing the phase relationship of said voltage and current of said load.

* * * * *